(12) United States Patent
Steffes et al.

(10) Patent No.: US 10,186,879 B2
(45) Date of Patent: Jan. 22, 2019

(54) ENERGY STORAGE DEVICE POWER CONSUMPTION MANAGEMENT

(71) Applicant: Steffes Corporation, Dickinson, ND (US)

(72) Inventors: Paul J. Steffes, Dickinson, ND (US); Thomas P. Steffes, Dickinson, ND (US); Austin P. Zeller, Dickinson, ND (US)

(73) Assignee: Steffes Corporation, Dickinson, ND (US)

( * ) Notice: Subject to any disclaimer, the term of this patent is extended or adjusted under 35 U.S.C. 154(b) by 165 days.

(21) Appl. No.: 15/110,898

(22) PCT Filed: Jan. 16, 2015

(86) PCT No.: PCT/US2015/011779
§ 371 (c)(1),
(2) Date: Jul. 11, 2016

(87) PCT Pub. No.: WO2015/116408
PCT Pub. Date: Aug. 6, 2015

(65) Prior Publication Data
US 2016/0344204 A1    Nov. 24, 2016

Related U.S. Application Data

(60) Provisional application No. 61/933,923, filed on Jan. 31, 2014.

(51) Int. Cl.
*H02J 7/00* (2006.01)
*H02J 3/14* (2006.01)
(Continued)

(52) U.S. Cl.
CPC .............. *H02J 7/0021* (2013.01); *G05F 1/66* (2013.01); *H02J 3/14* (2013.01); *H02J 3/28* (2013.01);
(Continued)

(58) Field of Classification Search
None
See application file for complete search history.

(56) References Cited

U.S. PATENT DOCUMENTS 88,055 A    3/1869  McManus
4,228,362 A  10/1980 Jacobs
(Continued)

FOREIGN PATENT DOCUMENTS

DE    4337388 A1    5/1994
GB    2482426 A     2/2012
(Continued)

OTHER PUBLICATIONS

Kulshretha, et al.Intelligent Energy Management System Simulator for PHEVs at Municipal Poarking Deck in a Smart Grid Environment, 2009 IEEE.*
(Continued)

*Primary Examiner* — Robert A Cassity
(74) *Attorney, Agent, or Firm* — Brian D. Kaul; Westman, Champlin & Koehler, P.A.

(57) ABSTRACT

An energy storage device includes a device controller, an electrical energy converter, an energy storage medium and a power metering device. In a method of managing electrical power consumption by a group of the energy storage devices, a measured power level is output from the power metering device of each energy storage device. The power level represents a rate of electrical energy consumption by the electrical energy converter of the device. The measured power levels of each of the devices are communicated to a
(Continued)

system controller using the device controllers. An aggregate power level is calculated based on the measured power levels, and is stored in memory using the system controller. In some embodiments, the aggregate power level is communicated to a remote location, such as an electrical power distribution system.

7 Claims, 9 Drawing Sheets

(51) Int. Cl.
*H02J 3/28* (2006.01)
*H02J 7/34* (2006.01)
*G05F 1/66* (2006.01)
*H02J 13/00* (2006.01)

(52) U.S. Cl.
CPC ............... *H02J 7/34* (2013.01); *H02J 13/00* (2013.01); *Y02B 70/3225* (2013.01); *Y04S 20/222* (2013.01); *Y04S 20/224* (2013.01)

(56) References Cited

U.S. PATENT DOCUMENTS

| | | | |
|---|---|---|---|
| 4,245,319 A | 1/1981 | Hedges | |
| 4,317,049 A | 2/1982 | Schweppe | |
| 4,337,388 A | 6/1982 | July | |
| 4,348,668 A | 9/1982 | Gurr et al. | |
| 4,449,178 A | 5/1984 | Blau, Jr. et al. | |
| 5,274,571 A | 12/1993 | Hesse et al. | |
| 5,498,490 A | 3/1996 | Brodd | |
| 5,956,462 A | 9/1999 | Langford | |
| 5,968,393 A | 10/1999 | Demaline | |
| 6,080,971 A | 6/2000 | Seitz et al. | |
| 6,150,795 A | 11/2000 | Kutkut et al. | |
| 6,194,867 B1 | 2/2001 | Cummings et al. | |
| 6,452,363 B1 | 9/2002 | Jabaji | |
| 6,826,356 B1 | 11/2004 | Wanecski | |
| 6,900,556 B2 | 5/2005 | Provanzana et al. | |
| 7,010,363 B2 | 3/2006 | Donnelly et al. | |
| 7,149,605 B2 | 12/2006 | Chassin et al. | |
| 7,199,482 B2 | 4/2007 | Hopewell | |
| 7,253,586 B2 | 8/2007 | Kangas et al. | |
| 7,346,274 B2 | 3/2008 | Bradenbaugh | |
| 7,420,293 B2 | 9/2008 | Donnelly et al. | |
| 7,567,751 B2 | 7/2009 | Fabrizio | |
| 7,628,123 B2 | 12/2009 | Inami et al. | |
| 7,663,344 B2 | 2/2010 | Le Gall et al. | |
| 7,715,951 B2 | 5/2010 | Forbes, Jr. et al. | |
| 7,755,325 B2 | 7/2010 | Taurand | |
| 8,010,240 B2 | 8/2011 | Mattiocco et al. | |
| 8,063,607 B2 | 11/2011 | Crawford et al. | |
| 8,073,573 B2 | 12/2011 | Chassin et al. | |
| 8,121,742 B2 | 2/2012 | Flohr et al. | |
| 8,367,984 B2 | 2/2013 | Besore et al. | |
| 8,805,597 B2 | 8/2014 | Steffes et al. | |
| 9,037,308 B2 | 5/2015 | Steffes et al. | |
| 9,142,994 B2 | 9/2015 | Berkowitz et al. | |
| 2001/0020615 A1 | 9/2001 | Bradenbaugh | |
| 2002/0128747 A1 | 9/2002 | Mima | |
| 2002/0147529 A1 | 10/2002 | Johnson | |
| 2002/0190692 A1 | 12/2002 | Marten | |
| 2004/0010649 A1 | 1/2004 | Weaver et al. | |
| 2004/0042772 A1 | 3/2004 | Whitford et al. | |
| 2004/0176858 A1 | 9/2004 | Kuwahara et al. | |
| 2004/0225648 A1 | 11/2004 | Ransom et al. | |
| 2005/0077368 A1 | 4/2005 | Zak et al. | |
| 2005/0109763 A1 | 5/2005 | Lee et al. | |
| 2005/0187727 A1 | 8/2005 | Weik et al. | |
| 2007/0028858 A1 | 2/2007 | Donnelly et al. | |
| 2007/0145952 A1 | 6/2007 | Arcena | |
| 2007/0183758 A1 | 8/2007 | Bradenbaugh | |
| 2007/0271006 A1 | 11/2007 | Golden et al. | |
| 2008/0167756 A1 | 7/2008 | Golden et al. | |
| 2008/0185451 A1 | 8/2008 | Simon et al. | |
| 2009/0101085 A1 | 4/2009 | Arensmeier et al. | |
| 2009/0105888 A1 | 4/2009 | Flohr et al. | |
| 2009/0187499 A1 | 7/2009 | Mulder et al. | |
| 2009/0195070 A1 | 8/2009 | Takegami et al. | |
| 2010/0004790 A1 | 1/2010 | Harbin et al. | |
| 2010/0072817 A1 | 3/2010 | Hirst | |
| 2010/0094470 A1 | 4/2010 | Besore et al. | |
| 2010/0163016 A1 | 7/2010 | Pan | |
| 2010/0187219 A1 | 7/2010 | Besore et al. | |
| 2010/0204849 A1 | 8/2010 | Steffes et al. | |
| 2010/0218027 A1 | 8/2010 | Boss et al. | |
| 2010/0289451 A1 | 11/2010 | Tuffner et al. | |
| 2011/0023517 A1 | 2/2011 | Labaume et al. | |
| 2011/0057617 A1 | 3/2011 | Finberg et al. | |
| 2011/0082598 A1 | 4/2011 | Boretto et al. | |
| 2011/0147360 A1 | 6/2011 | Hammerstrom | |
| 2011/0172837 A1 | 7/2011 | Forbes, Jr. | |
| 2011/0184575 A1 | 7/2011 | Kawamoto et al. | |
| 2011/0245987 A1 | 10/2011 | Pratt et al. | |
| 2012/0147892 A1 | 6/2012 | Basso et al. | |
| 2012/0160472 A1 | 6/2012 | Kim et al. | |
| 2013/0096728 A1* | 4/2013 | Steffes | H02J 3/14 700/291 |
| 2014/0358310 A1 | 12/2014 | Steffes et al. | |

FOREIGN PATENT DOCUMENTS

| | | |
|---|---|---|
| WO | 2011127047 A2 | 10/2011 |
| WO | 2012149244 A1 | 11/2012 |
| WO | 2015116408 A2 | 8/2015 |

OTHER PUBLICATIONS

International Search Report and Written Opinion, dated Jul. 27, 2015 for International Patent Application No. PCT/US2015/011779, filed Jan. 16, 2015.
Preetika Kulshrestha et al: "Intelligent Energy Management System Simulator for PHEVs at Municipal Parking Deck in a Smart Grid Environment" IEEE, 2009, pp. 1-6. XP5520309A1.
Steffes, Paul, P.E. "Grid-Interactive Electric Thermal Storage (GETS) Space and Water Heating", http://www.steffes.com/LiteratureRetrieve.aspx?ID=115580, date unknown, 6 pages.
International Search Report and Written Opinion of PCT/US2012/035348, dated Aug. 21, 2012.
International Search Report and Written Opinion of PCT/US2015/011779, dated Jul. 27, 2015.
McKeown et al., "OpenFlow: Enabling Innovation in Campus Networks", ACM SIGCOMM Computer Communication Review, vol. 38, No. 2, Apr. 2008, pp. 69-74.
Article entitled, "Smart Electric Newsletter #3", http://www.smartelectricnews.com, (2008), 9 pages, First Conferences Ltd.
Article entitled, "Earth Notes: A Note on the Potential Value of "Dynamic Demand" Control", http://www.earth.org.uk/note-on-dynamic-demand-value.html, May 17, 2009, 9 pages.
Article entitled, "Dynamic Demand (Electric Power)", http://en.wikipedia.org/wiki/Dynamic_demand_(electric_power), May 17, 2012, 4 pages.
Article entitled, "Dynamic Demand: Best Kept Energy Secret?", http://www.bbc.co.uk/blogs/ipm/2008/11/dynamic_demand_best_kept_energ.shtml#comments, May 17, 2012, 3 pages.
Examiner's Report for Canadian Patent Application No. 2,801,938, dated Mar. 20, 2015.
First Examiner's Report for Australian Patent Application No. 2012249617, dated Jun. 17, 2015.
EPO Communication from European Patent Application No. 12721991.3, dated Sep. 2, 2014.
Examiner's Report for Canadian Patent Application No. 2,801,938, dated Mar. 17, 2016.
A. Brooks et al: "Demand Dispatch", IEEE Power and Energy Magazine, vol. 8, No. 3, pp. 20-29, May-Jun. 2010.
Examiner's Report from Canadian Patent Application No. 2,690,662, dated Oct. 9, 2014.

(56) References Cited

OTHER PUBLICATIONS

Preetika Kulshrestha et al.: "Intelligent Energy Management System Simulator for PHEVs at Municipal Parking Deck in a Smart Grid Environment", 2009 IEEE Power & Energy Society General Meeting, Jul. 30, 2009, pp. 1-6.

* cited by examiner

ENERGY STORAGE DEVICE POWER CONSUMPTION MANAGEMENT

CROSS-REFERENCE TO RELATED APPLICATION

This Application is a Section 371 National Stage Application of International Application No. PCT/US2015/011779, filed Jan. 16, 2015 and published as WO 2015/116408 A2 on Aug. 6, 2015, in English; which claims the benefit of U.S. Provisional Application No. 62/933,923 filed Jan. 31, 2014; the contents of which are hereby incorporated by reference in their entirety.

BACKGROUND

For some electrical power distribution systems, balancing power generation with energy demands (i.e., load) can be challenging, particularly when the electrical power distribution systems are connected to electrical power generating systems having a variable power output, such as wind power generators and solar power generators. For instance, wind power generators generate electrical energy outputs that vary widely depending on the wind speeds. Additionally, the power generated by such systems cannot be easily controlled by adding or removing wind turbines responsive to the energy load on the system.

As a result, variable output power generators often generate electrical energy that exceeds the demand on the electrical power distribution systems, such as during high wind conditions at off-peak power demand times. Such excess energy may be wasted if the load on the electrical power distribution system is not adjusted.

For many years electrical power distribution systems have controlled energy consuming devices through a communication that turns the devices on or off. Typically, this control is used to reduce the power demand on electrical power distribution system peak power consumption periods, as described in U.S. Pat. No. 8,010,240. U.S. Pat. No. 8,121,742 discloses an energy distribution system that controls the activation and deactivation of a group of water heaters for the purpose of controlling the load on the grid. This activation and deactivation of groups of electrical devices by the electrical power distribution system is conducted without actual knowledge of how it may affect the energy demands placed on the electrical power distribution system. Accordingly, control of the actual energy demand using these techniques is limited.

U.S. Pat. No. 8,805,597, which issued to Steffes Corporation, discloses a technique for controlling a rate of energy consumption by electrical appliances responsive to a signal from the electrical power distribution system. This allows the electrical power distribution system to adjust the energy consumption of electrical appliances to meet its needs.

SUMMARY

Some embodiments of the invention are directed to a method of managing electrical power consumption by a group of energy storage devices. In some embodiments, the energy storage devices comprise a device controller, an electrical energy converter, an energy storage medium and a power metering device. In some embodiments, the energy storage medium includes a heat storage medium, a battery, or a chemical storage medium.

In some embodiments of the method, a measured power level is output from the power metering device of each energy storage device. The power level represents a rate of electrical energy consumption by the electrical energy converter of the device. The measured power levels of each of the devices are communicated to a system controller using the device controllers. An aggregate power level is calculated based on the measured power levels, and is stored in memory using the system controller. In some embodiments, the aggregate power level is communicated to an electrical power distribution system using the system controller.

In some embodiments of the method, a first charge level is received from each of the energy storage devices. Each charge level indicates a level of charge of the energy storage medium. A first aggregate charge level of the energy storage devices is calculated based on the first charge levels. A group energy consumption rate is calculated based on the first aggregate charge level. Electrical energy is consumed using the electrical energy converters of the energy storage devices at individual rates that are based on the group energy consumption rate.

In some embodiments of the method, a control signal indicating the group energy consumption rate is communicated from the system controller to the device controllers. Electrical energy is then consumed using the electrical energy converters of the energy storage devices at the individual rates, which are based on the control signal.

In some embodiments of the method, the individual rate is calculated for each device based on the group energy consumption rate and the first charge level of the device. Electrical energy is consumed by each device at the individual rate using the electrical energy converter of the device. In some embodiments, the calculation of the individual rate for each device includes calculating a difference between the group energy consumption rate and the first charge level of the device.

In some embodiments of the method, a second charge level is received from a subset of the energy storage devices, and a second aggregate charge level of the energy storage devices is calculated based on the received second charge levels and the first charge levels, from which a second charge level was not received. A second group energy consumption rate is determined based on the second aggregate charge level, and electrical energy is consumed using the electrical energy converters of the energy storage devices at a rate that is based on the second group energy consumption rate.

In some embodiments of the method, a command signal, which includes a commanded power consumption rate, is received from an electrical power distribution system, the command signal including a commanded power consumption rate. The group energy consumption rate is calculated based on the aggregate charge level, the commanded power consumption rate and a charge level index.

In some embodiments of the method, a charge level is received from each of the devices. The charge level for each device indicates a level of charge of the energy storage medium of the device. A charge level setting is set for each device for a future time period based on the received charge level of the device. The time period is started and a command signal, which includes a commanded power consumption rate, is received from an electrical power distribution system. A group energy consumption rate is determined based on the charge level settings, the commanded power consumption rate and a charge level index, using the system controller. Each of the devices is controlled to consume electrical energy at an individual rate using the electrical energy converter based on the group energy consumption rate and the charge level setting for the device. The steps of receiving the command signal, determining the group energy consumption rate, and controlling each of the devices to consume electrical energy at the individual rate, are repeated until the expiration of the time period.

In some embodiments of the method, an aggregate charge level of the energy storage devices is calculated based on the charge levels of the devices. In some embodiments, the group energy consumption rate is determined based on the aggregate charge level, the commanded power consumption rate and a charge level index.

In some embodiments of the method, a first measured power level is output from the power metering device of each energy storage device, the power level representing a rate of electrical energy consumption by the electrical energy converter of the device. A first aggregate power level is calculated based on the first measured power levels, and the first aggregate power level is stored in a memory. Second measured power levels are received from a subset of the energy storage devices, and a second aggregate power level is calculated based on the second measured power levels and the first measured power levels of the devices from which a second measured power level was not received. The second aggregate power level is stored in the memory. In some embodiments, a request is received from a remote location, and the first or second aggregate power level is communicated to the remote location in response to the request.

Some embodiments are directed to an electrical power consumption management system that includes a plurality of energy storage devices and a system controller. In some embodiments, each energy storage device includes a device controller, an electrical energy converter, an energy storage medium, and a power metering device. The power metering device is configured to output a measured power level representing a rate electrical energy consumption by the electrical energy converter. In some embodiments, the system controller calculates an aggregate power level based on the measured power levels received from the devices, and stores the aggregate power level in the memory. In some embodiments, the system controller controls a rate of energy consumption by the energy storage devices in accordance with a commanded rate received from an electrical power distribution system, and communicates the aggregate power level to the electrical power distribution system. In some embodiments, each of the energy storage mediums has a charge level, which is indicative of an amount of energy stored in the energy storage medium and/or a remaining energy storage capacity of the energy storage medium, and the system controller controls the rate of energy consumption of each of the devices based on the commanded rate and the charge level of the device.

DETAILED DESCRIPTION OF ILLUSTRATIVE EMBODIMENTS

Figure 1:
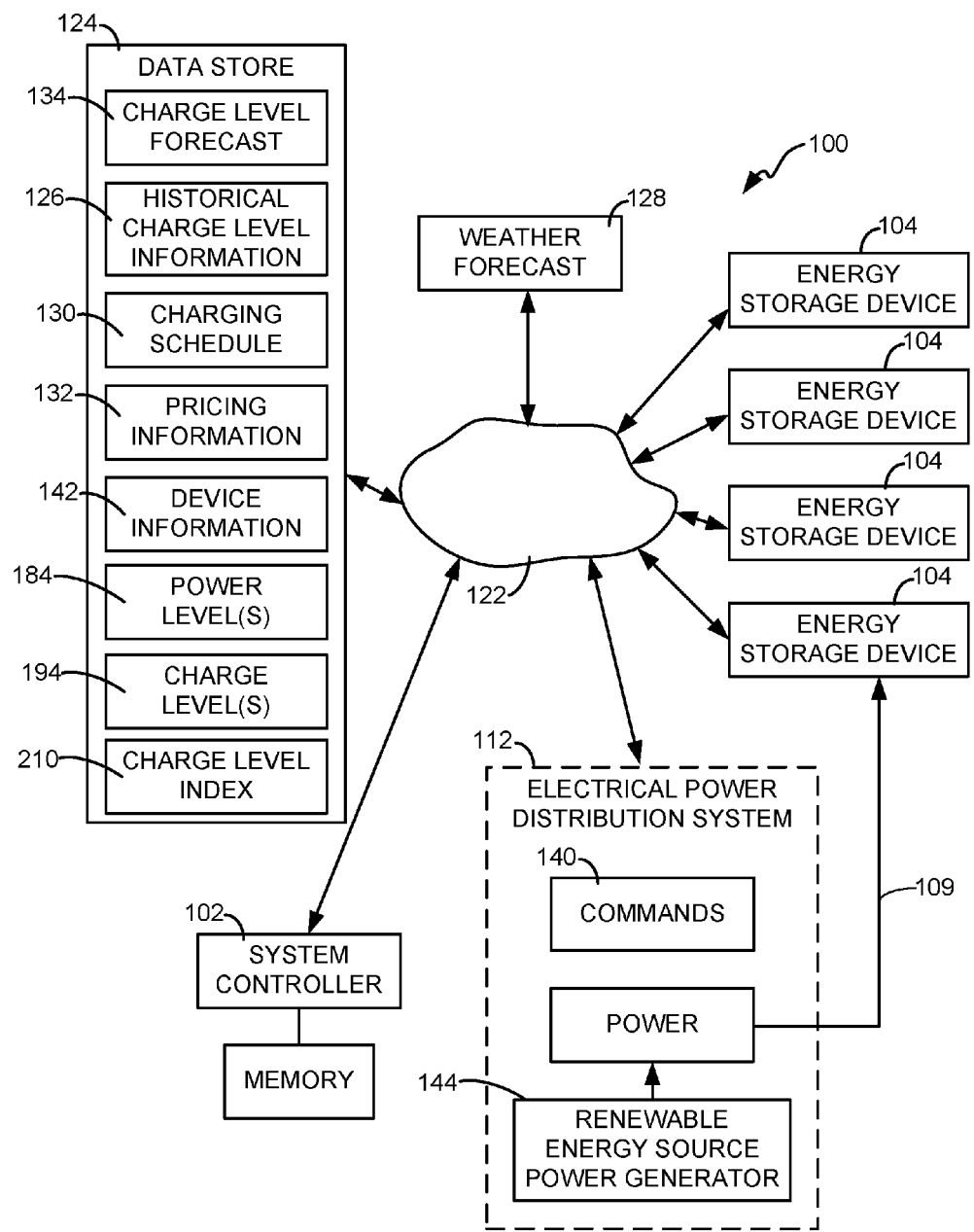
FIGS. 1 and 2 are simplified diagrams of a system in accordance with embodiments of the invention.

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices. Such computer readable media and memory for computer programs and software do not include transitory waves or signals.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

It is understood that one or more of the blocks (of the flowcharts and block diagrams) may be implemented by computer program instructions. These program instructions may be provided to a processor circuit, such as a microprocessor, microcontroller or other processor, which executes the instructions to implement the functions specified in the block or blocks through a series of operational steps to be performed by the processor(s) and corresponding hardware components.

Some embodiments of the invention are directed to methods of controlling energy consumption by energy storage devices and systems for carrying out the methods. In some embodiments, the electrical energy consumption of a group of energy storage devices is controlled to meet load demands of an electrical power distribution system. In some embodiments, this is accomplished by determining in advance an amount of energy load that can be provided to an electrical power distribution system by the devices and communicating the amount to the electrical power distribution system. In some embodiments, this control of the group of devices can also take into consideration the energy needs of the devices to meet the demands of the users of the devices.

Figure 2:
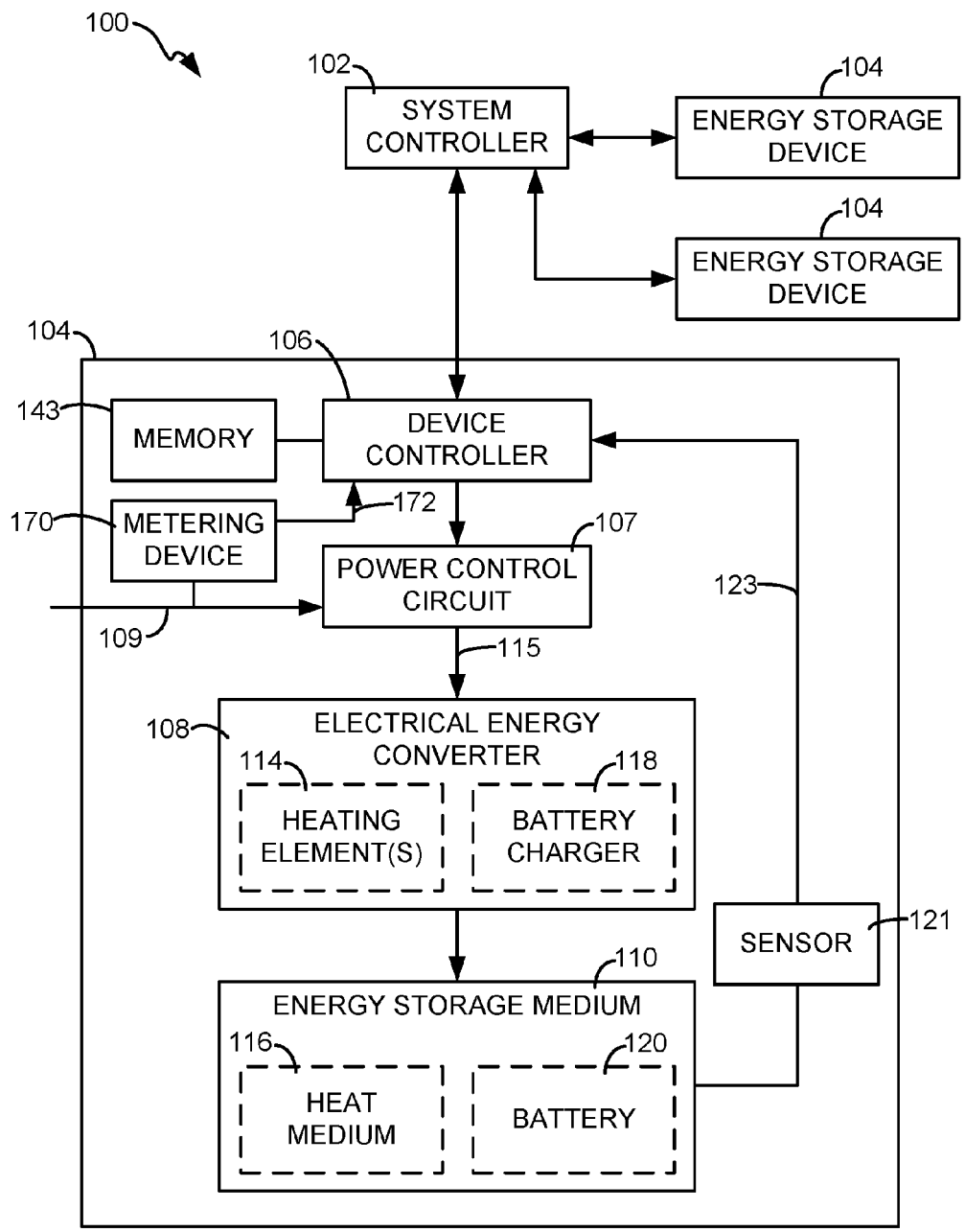

FIGS. 1 and 2 are simplified diagrams of a system 100 in accordance with embodiments in the invention. The system 100 generally includes a system controller 102 and a plurality of energy storage devices 104. In some embodiments, each energy storage device 104 includes a device controller 106, a power control circuit 107, an electrical energy converter 108 and/or an energy storage medium 110. The devices 104 each receive power 109 from an electrical power distribution system 112.

In some embodiments, the power control circuit 107 (FIG. 2) delivers a portion of the power 109 received from the electrical power distribution system 112 to the electrical energy converter 108 in the form of a power signal 115. In some embodiments, the power signal 115 is controlled by the device controller 106 and/or the system controller 102 to thereby control the amount of the power 109 consumed by the device 104.

The electrical energy converter 108 converts the power 115 into an energy form that is stored by the energy storage medium 110. In some embodiments, the energy converter 108 includes a heating device having one or more heating elements 114 that convert the electrical energy 115 received from the electrical power distribution system 112 into heat. The heat produced by the heating elements 114 is stored in a heat medium 116. The heating elements 114 may be located within or adjacent to the heat storage medium 116. The heating elements 114 can take on any conventional form that is suited to heating the medium 116. Exemplary heating elements 114 include resistive heating elements, such as heating coils, and other electrical heating elements.

Embodiments of the heat storage medium 116 include liquid and solid mediums. Exemplary liquid heat storage mediums 116 include water, oil and other conventional liquid heat storage mediums. In some embodiments, the heat storage medium 116 is water and the energy storage device 104 is in the form of a water heater. Exemplary solid heat storage mediums 116 include ceramic bricks, rocks, and other conventional solid heat storage mediums. In one exemplary embodiment, the energy storage device 104 is in the form of a space heater utilizing a solid heat storage medium 116, such as ceramic bricks.

In accordance with another embodiment, the energy storage devices 104 include a battery charging device having a battery charger 118 that converts the electrical power 115 received from the distribution system 112 into energy that is stored in a battery 120. The battery charger 118 and the battery 120 can be formed in accordance with conventional components. In some embodiments, the battery 120 represents one or more batteries, such as an array of batteries used to power an electric vehicle. In some embodiments, the battery 120 is an electro-chemical battery.

One embodiment of the system controller 102 includes one or more processors, such as microprocessors, that are configured to execute program instructions stored in memory of the system controller 102, such as a tangible computer storage medium (e.g., RAM, ROM, flash memory, etc.), or memory that is accessible by the system controller 102, to perform method steps and function in accordance with embodiments of the invention described herein. Likewise, the embodiments of the device controller 106 include one or more processors and accessible memory containing program instructions that are executable by the one or more processors to perform method steps and functions in accordance with embodiments of the invention described herein. In some embodiments, the system controller 102 performs functions of the device controller 106 described herein.

In some embodiments, the system controller 102 and the device controller 106 communicate through a conventional communication link. The communication link may be a physical communication link (wire, optical cable, etc.) or a wireless communication link (radio frequency, wireless network, etc.) in accordance with conventional communication methods. In some embodiments, the system controller 102 communicates with the device controller 106 through a conventional network 122. In some embodiments, the system controller 102 is configured to communicate with a remote data store, such as the database 124, over the network 122 or other conventional data communication link. In some embodiments, the system controller 102 is configured to communicate with the electrical power distribution system 112 through the network 122 or other suitable data communication link.

In some embodiments, the system controller 102 is independent of the electrical power distribution system 112. The system controller 102 controls the rate of consumption of electrical energy 109 from the electrical power distribution system 112 by a group of the energy storage devices 104. In some embodiments, the system controller 102 controls the aggregated rate of energy consumption by the group of energy storage devices 104. The specific group of energy storage devices 104 controlled by the system controller 102 can be selected as desired. Embodiments of the group of devices 104 include more than 10 devices 104, more than 100 devices 104, and more than 1000 devices 104.

In some embodiments, the system controller 102 communicates command signals to the devices 104. In some embodiments, the rate of energy consumption by each of the devices 104 is set based on command signals received by the device 104. More specifically, the rate of consumption of the electrical energy 109 supplied from the electrical power distribution system 112 by the electrical energy converter 108 is controlled responsive to received command signals from the system controller 102. In some embodiments, the commands from the system controller 102 are received by the device controllers 106, which controls the rate of electrical energy consumption by the corresponding device 104 based on the commands.

In some embodiments, the device controller 106 adjusts a duty cycle of the power 115 provided to the electrical energy converter 108 responsive to the command signal through control of the power control circuit 107. Thus, the device controller 106 may increase the duty cycle of the electrical power 115 supplied to the converter 108 from the power control circuit 107 resulting in an increase in the rate of energy consumption by the device 104. This increase in the rate of energy consumption by the converter 108 results in an increase in the charge rate of the medium 110, such as an increase in the heating rate of the heat medium 116 or an increase in the charging rate of the battery 120, for example. Likewise, the controller 106 may decrease the duty cycle of the electrical power to the converter 108 resulting in a decrease in the rate of energy consumption by the device 104 and a decrease in the charge rate of the medium 110. Other techniques for controlling the amount of energy consumed by the device 104 based on a command may also be used. Thus, the system controller 102 controls the rate of energy consumption of the group of devices 104 through the control of the rate of energy consumption by the individual devices 104.

In some embodiments, the devices 104 include at least one sensor 121 that is configured to sense a parameter of the energy storage medium. A signal 123 indicative of a value of the sensed parameter is communicated to the device controller 106, and/or the system controller 102. The communication of the signal 123 or the value indicated by the signal 123 may be communicated to the system controller 102 from the device controller 106. In some embodiments, commands issued by the system controller 102 for a particular device 104 that indicate a charging rate for the device 104 are based on the sensor output signal 123.

The sensed parameter output by the sensor 123 may be used by the device controller 106 in accordance with conventional device controllers. For instance, when the converter 108 is in the form of a heating element 114, the device controller 106 may receive temperature signals that indicate a temperature of the heat medium 116 and use the temperature signals to control the heating element 114. When the electrical energy converter 108 is in the form of a battery charger 118, the device controller 106 may receive charge level information in the form of voltage or current measurement values from the sensor 121 and control the electrical energy converter 108 in accordance with conventional battery charger controllers.

In some embodiments, the device controller 106 is configured to communicate with one or more data stores 124, such as a database. In some embodiments, the data store 124 is remote from the device controller 106, which communicates with the data store 124 through, for example, the network 122 or other suitable data communication link. The device controller 106 can receive information from the database 124 or deliver information for storage in the database 124.

In some embodiments, the device controller 106 and/or the system controller 102 logs device information 142 regarding each of the devices 104 in the data store 124 and/or within memory 143 of the devices 104. Embodiments of this device information include, for example, the energy usage of the device 104, the charge level of the energy medium 110 (e.g., the temperature of the heat medium 116 or the electrical energy storage level of the battery 120), the energy storage capacity of the medium 110, the remaining energy storage capacity of the medium 110, a target charge level of the medium 110, and other information.

In some embodiments, the system controller 102 sets the rate of electrical energy consumption or charge rate for the group of energy storage devices 104 for future time periods. The time periods can be any desired time period. In accordance with some embodiments, the time period is one hour. Other time periods, such as 0.5 hours, 1.5 hours, etc., may also be used. Thus, one embodiment of the controller 102 sets the rate of electrical energy consumption or charge rate for the group of energy storage devices 104 for consecutive time periods in the future. For instance, the charge rate for the group of devices 104 may be set to 1 megawatt for a time period of t0-t1, and adjusted to 1.3 megawatts for the time period t1-t2, and adjusted to 1.1 megawatts for the time period t2-t3, etc. In some embodiments, the charge rate that is set for a given time period is an average aggregate charge rate for the group of devices.

In some embodiments, the aggregated charge rate set by the system controller 102 for the group of energy storage devices 104 is unevenly divided among the individual devices 104 of the group. That is, the energy storage devices 104 may individually consume energy from the electrical power distribution system 112 at different rates than other devices 104 within the group.

In some embodiments, the charge rate set for an individual device 104 is based upon the charge level of the energy storage medium 110 relative to the charge levels of the energy storage mediums 110 of the other devices 104 in the group. The charge levels of the devices 104 can be obtained by the controller 102 from the individual devices 104 or from the device information 142 in the data store 124.

In some embodiments, the controller 102 assigns a higher energy consumption or charge rate to the energy storage devices 104 whose energy storage mediums 110 have a low charge level relative to the charge levels of the other energy storage devices 104 in the group. For instance, when the energy storage medium 110 is in a form of the heat medium 116, energy storage devices 104 whose heat mediums 116 are at a relatively low charge level (i.e., low temperature) would be assigned a higher charge rate than the energy storage devices 104 whose heat mediums 116 are at a higher charge level (i.e., high temperature). Similarly, when the energy storage medium 110 is in the form of a battery 120, the energy storage devices 104 whose battery 120 are at a relatively low charge level (i.e., low level of energy storage), will be assigned a higher charge rate than the energy storage devices 104 whose battery 120 are at a higher charge level (i.e., high level of energy storage).

In accordance with another embodiment, the controller assigns a charge rate to the individual devices 104 within the group based upon a charge deficit of the device 104, which generally indicates a remaining energy storage capacity of the energy storage medium 110 of the device. In some embodiments, the charge deficit of the device 104 is the difference between the charge level of the energy storage medium 110 of the device and a target charge level or a maximum charge level for the energy storage medium 110 of the device 104. The target charge level represents a desired level of charge for the medium 110 for the time period, which is set, for example, based on the needs of the owner of the device. For instance, when the device 104 is in the form of a water heater, the target charge level or water temperature is set based on the hot water needs of the owner. In some embodiments, the charge deficit for the devices 104 is calculated based on the current charge level of each of the devices 104 and the target charge level for each of the devices 104. This information may be obtained by the controller 102 from the device information 142 stored in the data store 124, or from the individual devices 104. Alternatively, the charge deficit for each of the devices may be continuously updated and stored in the data store 124 or the memory 143 by the controller 102 or the controller 106.

In some embodiments, the controller 102 sets the energy storage devices 104 having a relatively high charge deficit to consume energy at a higher rate than the energy storage devices 104 having lower charge deficit. This biases the distribution of the energy from the power distribution system 112 to the devices 104 having the greatest need. Thus, when the charge deficit is large for a given device, the controller 102 will weigh the need of the device 104 to consume energy when assigning the charge rate for the device 104 within the group.

In some embodiments, the target charge level is anticipated for each device 104 based on historical charge level information 126 that is accessible by the system controller 102 from the data store 124, or from local memory 143 of the devices 104. The historical charge level information 126 provides a forecast as to the energy needs of an individual storage device 104 over a given time period. For instance, when the energy storage device 104 is in the form of a heating device, the charge level of the heat medium 116 may need to be higher at times of greater heat discharge from the heat medium 116 to, for example, heat water used by a household. Thus, the charge rate set for individual devices 104 may be based upon a difference between the charge level of the energy storage medium 110 and the target charge level for the energy storage medium 110. The devices 104 having a larger difference between the target charge level and the current charge level of the medium 110 may be assigned a higher charge rate than the devices 104 having a lower difference between the target charge level and the current charge level of the medium 110.

The historical charge level information 126 may also be considered as an indicator of the use (i.e., energy output) of the device 104 for the delivery of energy from the energy storage medium 110. For instance, the information 126 may indicate the delivery of heat from the medium 110 for use in a home, for example. This discharge of heat from the medium 110 is useful in assessing the charge level of the medium 110 that is required to satisfy the needs of the user of the device 104.

In some embodiments, the aggregate charge rate for the group of the devices 104 or the charge rate for individual devices 104 assigned by the system controller 102 may also be based on weather forecast information 128. The weather forecast information 128 may be acquired by the system controller 102 from a website or other conventional source. In some embodiments, the weather forecast information 128 may be stored in a data store 124 or stored in local memory that is accessible by the system controller 102. The weather forecast information 128 may be used to determine whether the charge level of one or more of the energy storage devices 104 should be adjusted for a given time period. For instance, when the device 104 is in the form of a heating device and the weather forecast information 128 indicates that a temperature for a given future time period will be either lower or higher than normal, the target charge level for the heat medium 116 for the time period may be adjusted based upon an estimated change in the demand for heat output from the heat medium 116 during the time period. Other information can also be used by the system controller 102 in determining the aggregate charge rate for the group of energy storage devices 104.

In some embodiments, the aggregate charge rate set by the system controller 102 for the energy storage devices 104 is based on a charging schedule 130 that may be accessed by the system controller 102. The charging schedule 130 may be stored in the data store 124, or other location where it may be accessed by the system controller 102. The charging schedule 130 generally identifies the periods of time when the energy storage devices 104 will be activated to consume electrical power from the electrical power distribution system 112. The charging schedule 130 may also indicate charge rates for the devices 104 for the time periods. The charging schedule 130 may be manually set by the administrator of the system by programming the charging schedule 130 as desired. In some embodiments, the charging schedule 130 for a given day may be adjusted during the day.

In some embodiments, the charging schedule 130 for a given day may be set based on pricing information 132 for electricity from the electrical power distribution system 112 for the given day. The pricing information 132 preferably sets out time-based pricing information for electricity from the distribution grid 112. In some embodiments, the pricing information 132 is accessible by the system controller 102 for setting the charging schedule 130. The pricing information may be stored in a remote data store, such as the database 124, or other location accessible by the system controller 102. As a result, the system controller 102 can set the charging schedule 130 for a given day such that the devices 104 are activated to consume energy supplied by the electrical power distribution system 112 during periods of time where the electricity supplied by the electrical power distribution system 112 is at its lowest price, while avoiding activation of the devices 104 when the electricity is more expensive. Thus, the system controller 102 can set the charging schedule 130 to have more or fewer periods when the devices 104 within the group are activated depending on the pricing information 132.

In some embodiments, the system controller 102 adjusts the charging schedule 130 for time periods in a given day that are more than 90 minutes away based on the charge levels of the devices 104. For instance, the charging schedule 130 may be adjusted if the charge levels of the devices 104 would exceed their capacity, or if the charge levels of the devices 104 are too low to satisfy the needs of the user.

In some embodiments, the system controller 102 generates a charge level forecast or schedule 134 that identifies the charge level that each of the devices 104 should have at the beginning of future time periods. The charge level forecast 134 may be stored in local memory that is accessible by the system controller 102, or in a remote data store 124, as shown in FIG. 1. In some embodiments, the charge level forecast 134 for a given energy storage device 104 is based upon the current charge level of the device 104, anticipated charge levels of the device 104 that precede the specific interval, the weather forecast information 128, the historical charge level information 126 and/or the charging schedule 130. As this information changes, the charge level forecast for a specific future time interval for a device 104 may be adjusted by the system controller 102. In some embodiments, the charge rate set by the system controller 102 for the energy storage devices 104 for a given time interval is based on the charge level forecast 134 and the charging schedule 130.

In some embodiments, the charge level forecast 134 for the devices 104 is monitored by the system controller 102 to ensure that the charge levels of the devices 104 do not drop below a minimum threshold or exceed a maximum threshold. In some embodiments, if the charging level for any of the devices 104 is forecasted to fall outside the minimum or maximum thresholds of the device, the system controller 102 can adjust the charging schedule 130 and the charge rate for the energy storage device 104 accordingly. The maximum and minimum charge levels can be obtained from stored information on each of the devices 104 in the data store 124 or other accessible location, such as in memory of the devices 104.

In some embodiments, the system controller 102 sets the aggregate charge rate in the forecast 134 for the group of energy storage devices 104 for consecutive future time periods. In some embodiments, the charge rates are set for time periods of 1 hour. In accordance with another embodiment, the future time periods are each less than 2 hours. Other durations may also be used for the time periods.

In some embodiments, the system controller 102 sets the charge rate for a given time period a predetermined amount of time prior to the onset of the time period. In some embodiments, the charge rate for the group of energy storage devices 104 is set by the system controller more than 1 hour prior to the onset of the time period. In accordance with another embodiment, the system controller 102 sets the charge rate for the group of energy storage devices 104 approximately 2 hours before the onset of the time period.

While the goal of the charge rate assigned by the system controller 102 for a given time period for the group of devices 104, in accordance with some embodiments, is to have the devices 104 achieve the charge level for each of the devices 104 identified by the charge level forecast 130 by the beginning of the next time period, it is not critical that the devices 104 achieve this charge level. In some embodiments, it is acceptable to fall below the forecasted charge level or even exceed the forecasted charge level for the time period.

Once the aggregate charge rate for the group of energy storage devices 104 is set by the system controller 102 based on one or more of the factors described above, the distribution of the aggregate charge rate among the devices 104 may be adjusted. That is, each of the devices 104 may be monitored during the time period and adjustments can be made to the charge rates (rate of energy consumption) of the individual devices 104 based upon various factors, such as the charge level of the device 104 (i.e., the charge level of the device's medium 110) relative to the charge levels of the other devices 104 in the group, the charge deficit of the device 104 (i.e., difference between the current charge level of the device 104 and the target charge level for the device 104) as compared to the charge deficits of other devices 104 in the group, whether the charge levels of the devices 104 are exceeding a maximum charge level or falling below a minimum charge level, and/or other parameter.

In summary, the system controller 102 sets an aggregate charge rate for the energy storage devices 104 for consecutive future time periods throughout the day and stores the charge rate assignments for the devices 104 in the charging schedule 130, in accordance with some embodiments. The aggregate rate of energy consumption of the devices 104 in the group may be set by the system controller 102 based on various information, such as, historical charge level information 126, pricing information 132, weather forecast information 128 and/or a charge level forecast 134, for example. The aggregate charge rate or aggregate rate of energy consumption by the devices 104 within the group for a given period of time may be unevenly distributed among the devices 104 for the time period based on one or more factors described above. Additionally, adjustments may be made to the distribution of the aggregate rate of energy consumption among the devices 104 during the time period.

In some embodiments, the system controller 102 assists the electrical power distribution system or electrical grid 112 to provide a variable electrical load (i.e., rate of electrical consumption), which can assist the electrical power distribution system 112 to maintain the system within desired parameters. In general, the system controller 102 responds to commands 140 communicated from the electrical power distribution system 112 through the network 122 or other suitable communication path to follow a variable component of the grid, such as the need for fast regulation of the load, the need for load following, and the integration of large amounts of power generated by a renewable energy source power generator 144, for example.

The renewable energy source power generator 144 generates at least a portion of the power distributed by the electrical power distribution system 112, from a renewable energy source, such as wind, sunlight, rain, tides, water, geothermal heat or other renewable energy source. Power generated by the generator 144 may fluctuate significantly when the renewable source is, for example, wind or sun. Embodiments of the system 100 can quickly adjust the power consumed by the group of devices 104 to assist the electrical power distribution system 112 in absorbing and storing excess energy distributed by the system 112 and reducing the electrical load on the system 112 when necessary.

In some embodiments, the system 100 provides the variable electrical load during off-peak power demand periods, such as night when variable wind-generated energy can fluctuate significantly. Such wind-generated energy that would otherwise go unused may be stored by the devices 104.

Figure 3:
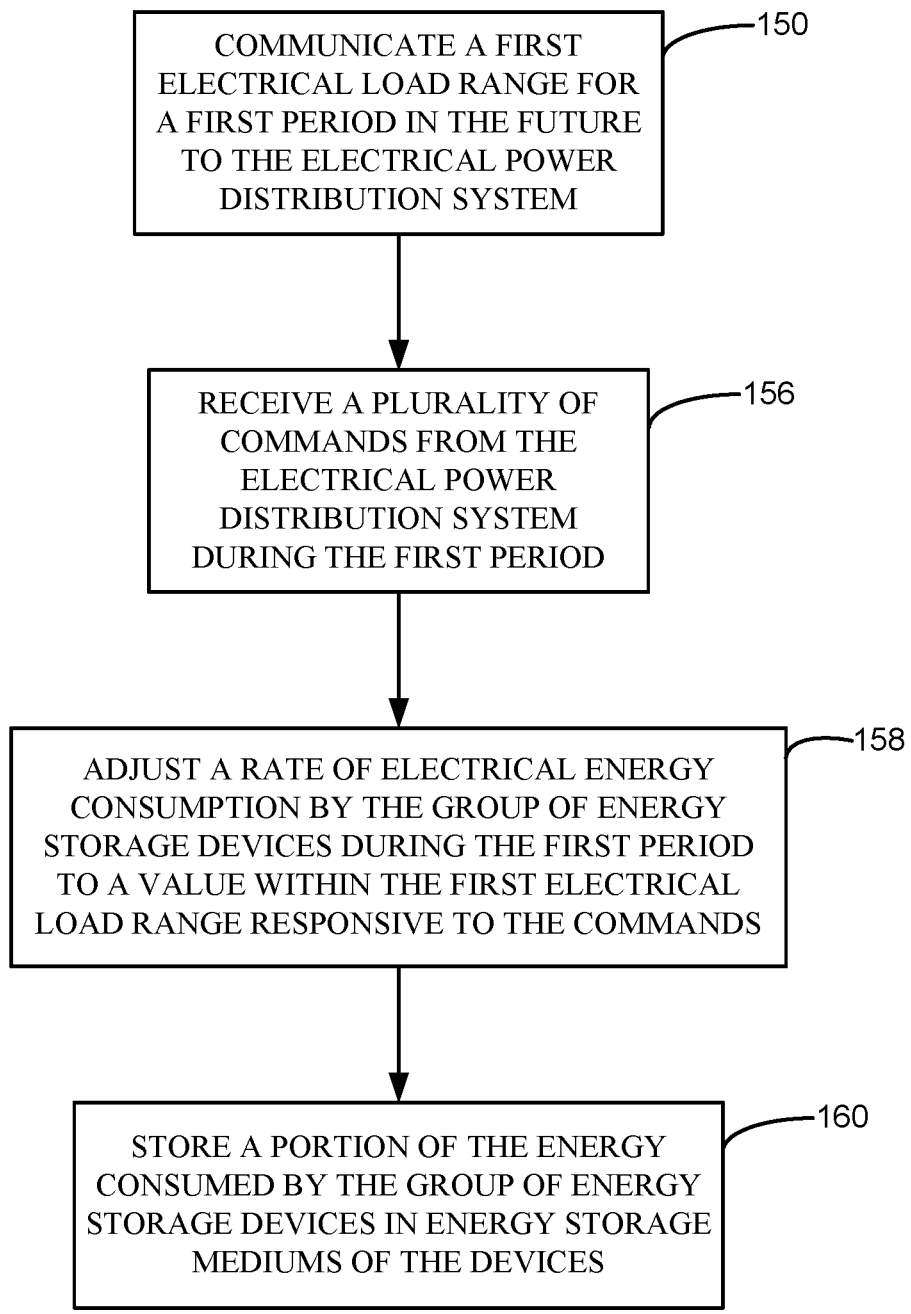
FIG. 3 is a flowchart illustrating a method of controlling electrical power consumption from an electrical power distribution system by a group of energy storage devices, in accordance with some embodiments of the invention.
Figure 4:
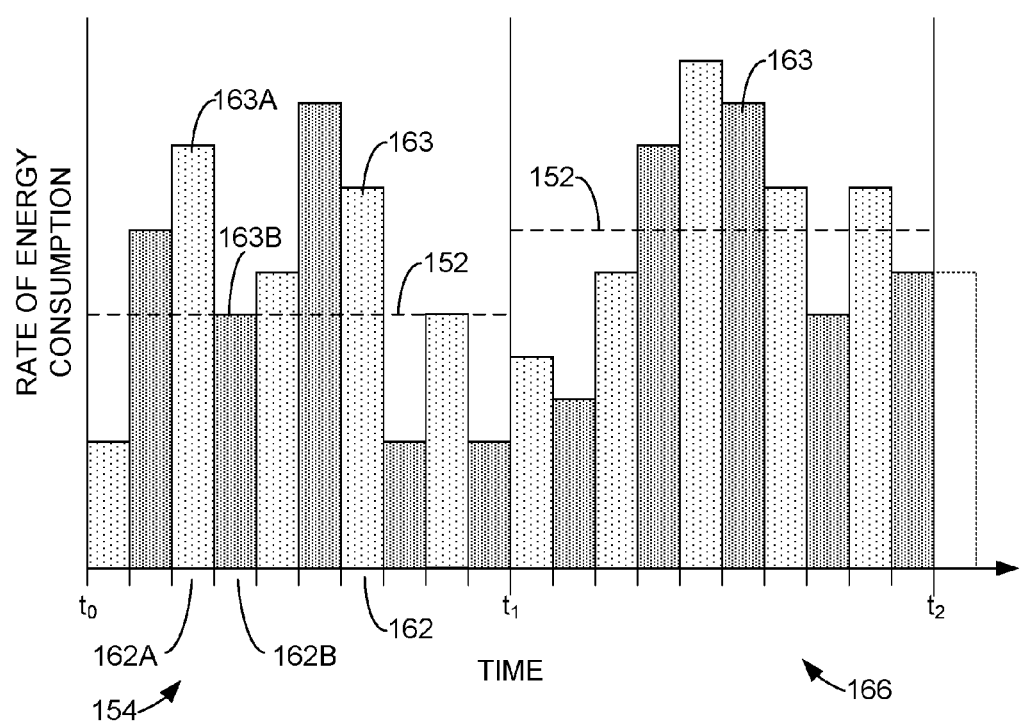
FIG. 4 is a chart illustrating aggregate rates of electrical energy consumption by the energy storage devices over time, in accordance with some embodiments of the invention.

FIG. 3 is a flowchart illustrating a method of controlling electrical power consumption from an electrical power distribution system 112 by a group of energy storage devices 104, in accordance with some embodiments of the invention. In some embodiments, the method is performed during an off-peak power consumption period, such as at night. FIG. 4 is a chart illustrating aggregate rates of electrical energy consumption by the energy storage devices 104 over time.

At 150 of the method, an electrical load range 152 (value indicated in FIG. 4) for a time period 154 (e.g., time t041) in the future is communicated to the electrical power distribution system 112 using the system controller 102. In some embodiments, the electrical load range corresponds to the average aggregate rate of electrical power consumption that is desired for the group of energy storage devices 104. Thus, the electrical load range 152 may be set by the system controller 102 based upon one or more of the factors described above, such as the charging schedule 130, the charge level forecast 134, the device information 142, the weather forecast 128, pricing information 132, the charge deficits of the devices 104, and/or other information.

At 156 of the method, a plurality of commands 140 are received from the electrical power distribution system 112 during the first period 154 using the controller. At 158, a rate of electrical energy consumption by the group of energy storage devices 104 is adjusted during the first period 154 to a value within the first electrical load range 152 responsive to each of the commands 140 using the system controller 102.

At 160, a portion of the energy consumed by the group of energy storage devices 104 during the first period 154 is stored in the energy storage mediums 110 of the devices 104. As discussed above, when the energy storage medium 110 comprises a heat medium 116, the energy consumed by the devices 104 is stored as heat in the heat medium 116. When the energy storage medium 110 includes a battery 120, the energy consumed by the devices 104 during the first period 154 is stored as chemical energy in the battery 120.

In some embodiments, the time period 154 is divided up into intervals 162, each represented by the width of the bars in the chart of FIG. 4. In some embodiments, the intervals 162 are approximately equal segments of time spanning the time period 154. In some embodiments, the intervals 162 are less than 10 seconds each. For instance, a time period over which load regulation service will be provided by the system 100 of the present invention may be 1 hour having intervals 162 of 10 seconds or less, such as every 4 seconds. In accordance with another embodiment, the time period 154 is divided into intervals of 5 minutes each. Other longer or shorter time intervals may also be used.

In some embodiments of step 156 of the method, the plurality of commands 140 from the electrical power distribution system 112 are each received during a different interval 162 of the period 154. In one embodiment of step 156, the commands 140 are communicated to the system controller 102 in step 156 for a given interval in advance of the onset of the interval. In one embodiment of step 158 of the method, the rate of electrical energy consumption by the group of energy storage devices 104 during the first period 154 is adjusted for the next interval 162 in accordance with the command 140 received during the preceding interval 162. For instance, the rate of energy consumption 163B by the group of energy storage devices 104 consumed during the interval 162B is based on the command 140 received from the electrical power distribution system 112 by the controller 102 during the preceding interval 162A.

In some embodiments, each of the commands 140 issued by the electrical power distribution system 112 includes a commanded rate. In one embodiment of the adjusting step 158, the rate of electrical energy consumption 163 by the group of energy storage devices 104 is set to the commanded rate for the interval 162 of the period 154 corresponding to the command 140. In some embodiments, the commanded rate is within the range indicated by the electrical load range 152 communicated in step 150.

In some embodiments, the commanded rate indicates a specific rate of energy consumption, such as 4 kilowatts, that is within the range 152. In other embodiments, the commanded rate indicates a percentage adjustment from the electrical load range 152. For instance, the commanded rate may indicate a percentage from which the commanded rate of electrical energy consumption by the devices 104 can be determined based on the electrical load range 152. For instance, when the electrical load range 152 indicates a maximum electrical consumption rate for the period 154, the commanded rate may indicate a value of 0-100%, from which the desired energy consumption rate for the corresponding interval 162 can be determined. When the electrical load range 152 indicates a median aggregate rate of energy consumption by the devices 104, the commanded rate may indicate a value of −100-100% of the median value, from which the desired aggregate rate of energy consumption by the devices 104 can be determined. Thus, the rate of electrical energy consumption 163 in a given interval may exceed the rate indicated by the electrical load range 152, as shown in FIG. 4. When the electrical load range 152 indicates an average aggregate rate that is greater than half the maximum rate, adjustments may be made to ensure that the commanded rate does not exceed the maximum available rate.

In accordance with some other embodiments, the commands 140 may indicate a plurality of commanded rates, such as a zero rate, a commanded rate that is the nominal or base rate (e.g., an average rate indicated by the electrical load range 152), and a maximum available rate, for example.

In one embodiment of step 158, the controller 102 unevenly distributes the commanded rate among the energy storage devices 104 of the group. That is, the aggregate rate of energy consumption 163 corresponding to the commanded rate is divided up among the devices 104 such that some of the devices 104 consume higher amounts of electrical energy than other devices 104. This allows the electrical energy to be distributed among the devices 104 of the group based on their needs or other factors. In one embodiment, the system controller 102 accesses a charge deficit for each of the energy storage devices 104 from the data store 124 or other location and adjusts the rate of electrical energy consumption by each of the devices in step 158 based on the charge deficits. In one embodiment of step 158, the system controller sets higher rates of electrical energy consumption for the devices 104 having larger charge deficits than the devices 104 having lower charge deficits. In some embodiments, the controller 102 calculates the charge deficit for each of the energy storage devices based on their current charge levels and either a target charge level or a maximum charge level for the mediums 110 of the devices 104. This information may be received from the devices 104 through a communication with the controllers 106, or accessed from device information 142 stored in a data store 124.

In some embodiments of the method, the system controller 102 sets the electrical load range prior to communicating the load range to the electrical power distribution system 112. In one embodiment, the system controller 102 accesses a charge level forecast 134 for the group of energy storage devices 104 from a data store 124, or other location, and sets the electrical load range based on the charge level forecast. In some embodiments, the system controller 102 accesses a charging schedule 130 for the group of energy storage devices 104 and sets the electrical load range based on the charging schedule 130.

In some embodiments, the method described above is repeated for consecutive periods of time. Thus, after the expiration of the period 154, the method repeats steps 150, 156, 158 and 160 for the next period 166 corresponding to time t1 to t2. Thus, the system controller communicates an electrical load range 152 for the period 166 to the electrical power distribution system. A plurality of commands are then received from the electrical power distribution system 112 during the period 166. A rate of electrical energy consumption 163 by the group of energy storage devices 104 during the period 166 is then adjusted to a value within the electrical load range 152 responsive to each of the commands 140 using the system controller 102. A portion of the energy consumed by the group of energy storage devices 104 during the period 166 is stored in the mediums 110 of the devices 104. Additional embodiments of the method described above with regard to the period 154 are also applicable to the period 166.

Unlike conventional systems that assist in load regulation through remote activation and deactivation of groups of devices under the control of a electrical power distribution system, embodiments of the method performed by the system 100 provide advance notice to the electrical power distribution system 112 of the amount of power that is available for regulation. This provides the electrical distribution system 112 greater control over the electrical load being supplied with energy.

Embodiments of the invention also allow energy to be distributed among the devices 104 as desired, such as in accordance with the needs of the devices 104 relative to other devices within the group. This provides the system 100 with the ability to provide load regulation service to the electrical power distribution system 112 while enabling the devices 104 to meet the demands of the user. Other benefits and advantages over the prior art are also provided by the system 100.

In some embodiments, the system controller 102 determines an amount of energy that is consumed by the group of devices 104 during a given period of time, such as period 154 or 166. In some embodiments, this consumed electrical energy data is stored for future access, such as in the data store 124 or other memory. In some embodiments, the system controller 102 communicates the amount of energy consumed by the group of energy storage devices 104 to the electrical distribution system 112. This provides verification to the electrical power distribution system 112 that electrical energy is being consumed by the group of energy storage devices 104 in accordance with the transmitted commands 140.

In some embodiments, the energy storage devices 104 each include a power metering device 170 (FIG. 2) that is configured to output a measured power level 172 representing a rate of electrical energy consumption (i.e., electrical load) by the electrical energy converter 108. In some embodiments, the measured power level output 172 is communicated to the system controller 102 either directly or through the device controller 106 using conventional communication techniques.

The power metering device 170 may take the form of conventional power metering devices, which measure an electrical current to the power control circuit 107 or other parameter to measure or estimate the rate of electrical energy consumption by the electrical energy converter 108. In some embodiments, the power metering device 170 includes a current transformer and a power metering chip, which takes a physical measurement of the current supplied to the power control circuit 107 and the electrical energy converter 108, converts the measurement to power, and outputs the signal 172 indicating the power measurement.

Figure 5:
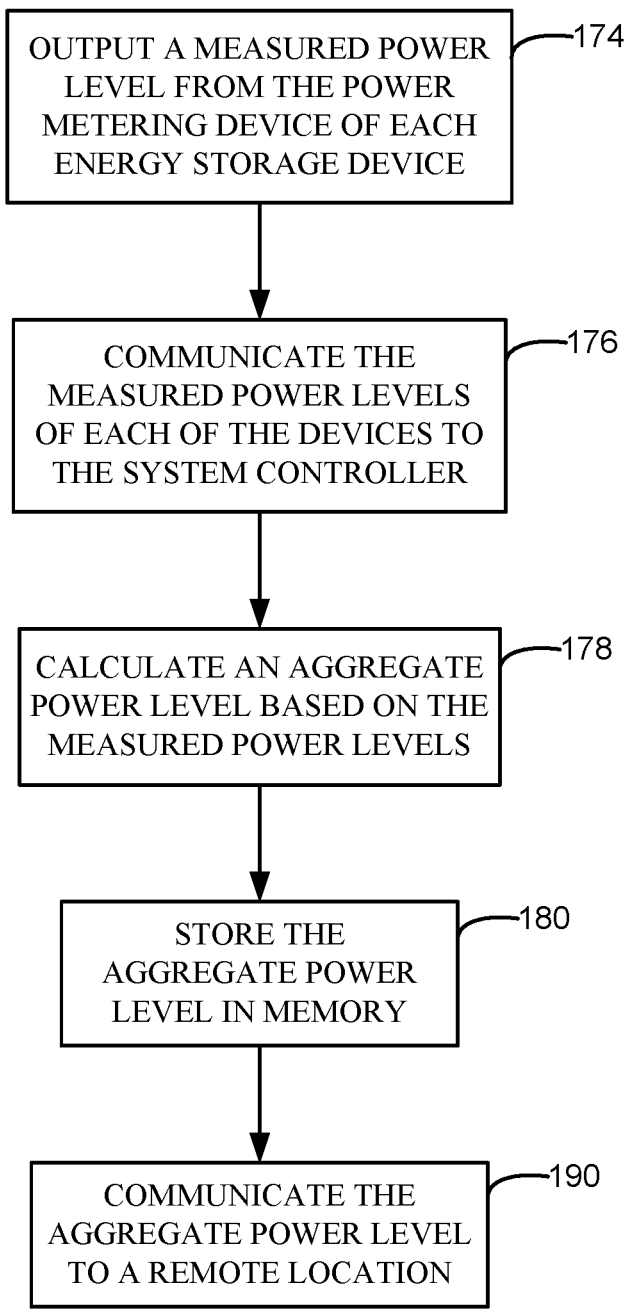
FIGS. 5-9 are flowcharts illustrating methods in accordance with embodiments of the invention.

FIG. 5 is a flowchart illustrating a method of managing electrical power consumption by a group of energy storage devices 104. In some embodiments, each of the energy storage devices 104 includes a device controller 106, an electrical energy converter 108, an energy storage medium 110 and a power metering device 170 in accordance with one or more embodiments described above. In some embodiments, the electrical energy converters 108 of the devices 104 consume electrical energy 109 supplied from the electrical power distribution system 112 and store a portion of the electrical energy in the medium 110, in accordance with one or more embodiments described above.

At 174 of the method, a measured power level 172 is output from the power metering device 170 of each energy storage device 104. The measured power levels indicate the rates at which electrical energy is being consumed by the devices 104. At 176, the measured power levels 172 of each of the devices 104 are communicated to the system controller 102. Such a communication may be facilitated through the device controllers 106 of the devices 104, or made directly to the system controller 102 using conventional communication techniques. In some embodiments, the measured power levels 172 of each of the energy storage devices 104 are communicated to the system controller 102 through a network 122, as shown in FIG. 1.

At 178 of the method, an aggregate power level is calculated based on the measured power levels 172. In some embodiments the calculating step 178 involves the summation of each of the individual measured power levels 172 received by the system controller 102 in step 176. In some embodiments, the calculating step 178 is performed by the system controller 102.

In some embodiments, the measured power levels 172 are communicated to an aggregating controller, which performs the calculating step 178 and communicates the aggregate power level to the system controller 102 to complete the objectives of steps 176 and 178. This may be beneficial in reducing the number of communications to the system controller 102. For instance, when the number of energy storage devices 104 within the group is very large, a plurality of aggregating controllers may each be used to aggregate the measured power levels 172 from a subset of the energy storage devices 104 within the group. Alternatively, the system controller 102 may comprise multiple controllers, some of which are responsible for aggregating the measured power levels 172 of some or all of the energy storage devices 104 within the group. Other controllers represented by the system controller 102 may be responsible for performing other functions of the system controller 102 described herein.

In some embodiments of the method, the aggregate power level is stored in memory. Exemplary embodiments of the memory in which the aggregate power level may be stored include memory of the system controller 102, memory 182 that is accessible by the system controller 102, the data store 124 (power level 184), or other location. Additionally, in some embodiments of the method, the individual power levels 172 are stored in memory, such as in the data store 124 as power levels 184, instead of performing the calculating step 178 and the storing step 180.

In some embodiments of the method, the aggregate power level is communicated to a remote location at 190. In some embodiments, the communicating step 190 is performed using the system controller 102 or other suitable controller. In some embodiments, when only the individual measured power levels 172 are stored in memory rather than the aggregate power level, the system controller 102 or other suitable controller calculates the aggregate power level by summing the individual measured power levels 172, and communicates the calculated aggregate power level to a remote location at step 190.

In some embodiments, the remote location includes an electrical power distribution system 112 (FIG. 1), such as a data store that is accessible by the system 112. In some embodiments, the communicating step 190 is performed in response to a request received from the remote location using the system controller 102. For instance, the electrical power distribution system 112 may request an update to the status of the load being supplied by the energy storage devices 104 to verify that that supplied load is in accordance with commands from the electrical power distribution system 112, such as those provided in method step 156 described above. Thus, the electrical power distribution system 112 may submit such a request during or after a time period 166 or an interval 162 within a time period 166, for example.

Some embodiments of the invention are directed to a method of managing electrical power consumption by a group of energy storage devices 104 to direct the energy storage devices 104 to individually consume electrical energy at an individual rate such that the aggregation of the individual rates of electrical energy consumption by the group of energy storage devices 104 is at a target electrical energy consumption rate or load. In some embodiments, the target electrical energy consumption rate or load is set in response to one or more commands from the electrical power distribution system 112, as described above. That is, during a particular time period 166 or interval 162 within a time period 166, a goal of the system controller 102 is to control the electrical energy consumption by the energy storage devices 104 such that the aggregation of the individual electrical loads provided by the energy storage devices 104 meets the demanded or targeted load of the electrical power distribution system 112.

Figure 6:
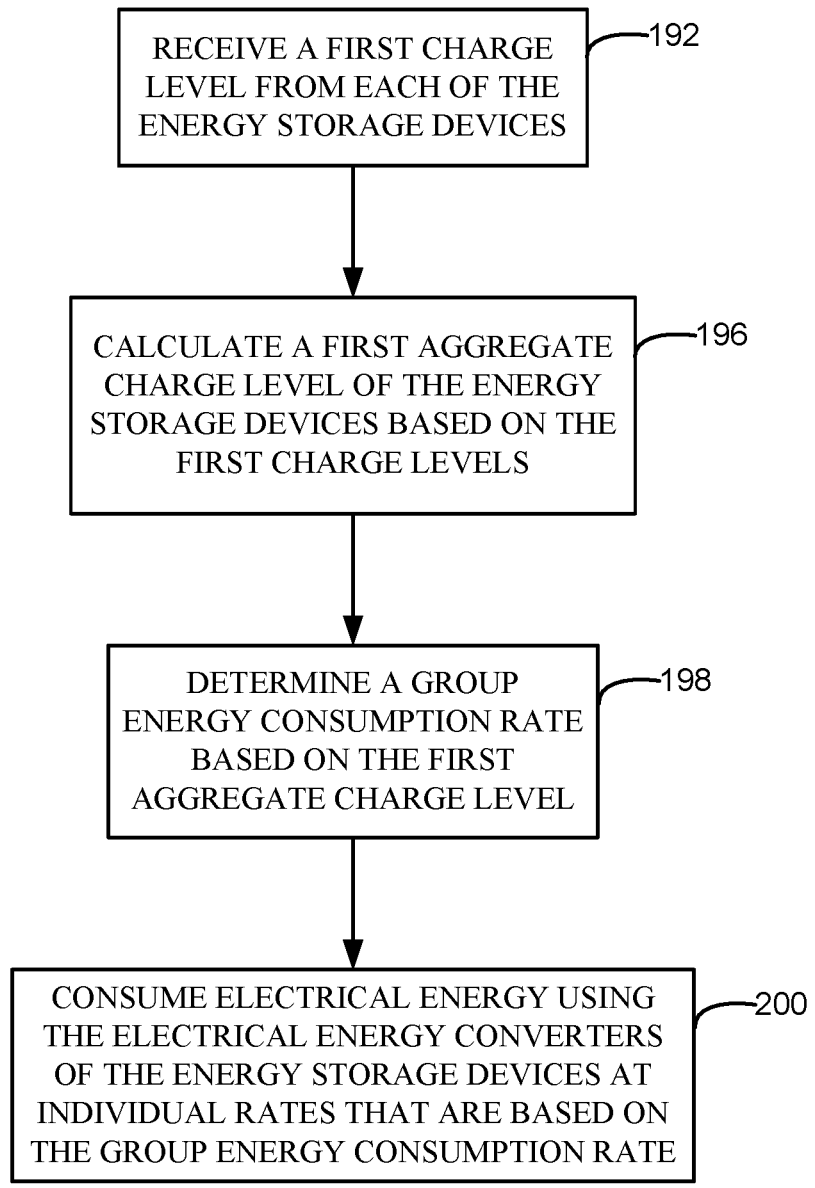

FIG. 6 is a flowchart illustrating a method of controlling the individual rates of electrical energy consumption or loads of the energy storage devices 104 such that the aggregate electrical load of the devices 104 meets the targeted load desired by the system controller 102 and/or the electrical power distribution system 112. At 192 of the method, the system controller 102 receives a first charge level from each of the energy storage devices 104. The first charge level indicates a level of charge of the energy storage medium 110 (FIG. 2). The charge level of the energy storage medium 110 may indicate a temperature of a heat medium 116, an electrical energy storage level of a battery or a chemical storage medium 120, as discussed above. The charge level may be determined by an output signal 123 from a suitable sensor 121, as shown in FIG. 2. In some embodiments, the charge level of each of the energy storage devices 104 is communicated to the system controller 102 using the corresponding device controller 106 and conventional data communication techniques. In some embodiments, the system controller 102 stores the charge levels received in step 192 as charge levels 194 in the data store 124, the memory 182, memory of the system controller 102, or in another suitable data storage device.

At 196 of the method, a first aggregate charge level of the energy storage devices 104 is calculated based on the first charge levels received in step 192. In some embodiments, the calculating step 196 is performed by the system controller 102 or other suitable controller or processor. In some embodiments, the aggregate charge level is stored as the charge level 194 in the data store 124 or other suitable location. In some embodiments, the storage of the charge levels or aggregate charge level 194 includes additional information beyond the current charge level of each of the devices 104 of the group. In some embodiments, this charge level information includes an identification of the particular energy storage device 104 corresponding to one of the charge levels, a date and/or time corresponding to the charge level, and other information.

At 198 of the method, a group energy consumption rate is determined based on the first aggregate charge level. In some embodiments, the determining step 198 is performed using the system controller 102 or other suitable controller or processor. At 200 of the method, electrical energy is consumed using the electrical energy converters 108 of the energy storage devices 104 at individual rates that are based on the group energy consumption rate.

In some embodiments, the individual rates of one or more of the devices 104 of the group of devices 104 are unique. That is, in some embodiments, the devices 104 consume electrical energy at different rates than other devices within the group based on the individual rates assigned to the devices 104. In general, the devices 104 having lower charge levels, or larger remaining energy storage capacities, are assigned higher electrical energy consumption rates than the devices 104 having energy storage mediums 110 at higher charge levels.

In some embodiments, the system controller 102 communicates a control signal indicating the group energy consumption rate to the devices 104, such as to the device controllers 106 of the devices 104. In some embodiments, the individual rates at which electrical energy is consumed using the electrical energy converters 108 of the devices 104 is based on the control signal from the system controller 102. That is, each of the individual rates is determined, at least in part, by the control signal communicated to the devices 104 that indicates the group energy consumption rate.

In some embodiments of the method, the consuming step 200 for each of the devices involves calculating the individual electrical energy consumption rate for the device based on the group energy consumption rate indicated, for example, by the control signal from the system controller 102, and the first charge level of the device 104. In some embodiments, the calculation of the individual rate for each device involves calculating a difference between the group energy consumption rate and a first charge level of the device 104. For instance, if the first charge level of a device 104 is 0% of its total charge capacity and the group energy consumption rate is 30%, the device 104 may calculate its individual energy consumption rate by subtracting the group energy consumption rate from the first charge level to reach an individual energy consumption rate of 30% (30%-0%=30%) of its maximum energy consumption rate. Other devices 104 within the group having first charge levels of 20% will calculate an individual electrical energy consumption rate of 10% (30%-20%=10%). Thus, each of the devices 104 within the group can have different individual electrical energy consumption rates depending on the charge levels of the devices 104, and devices 104 having lower charge levels will be set to higher individual rates than the devices 104 having higher charge levels.

Figure 7:
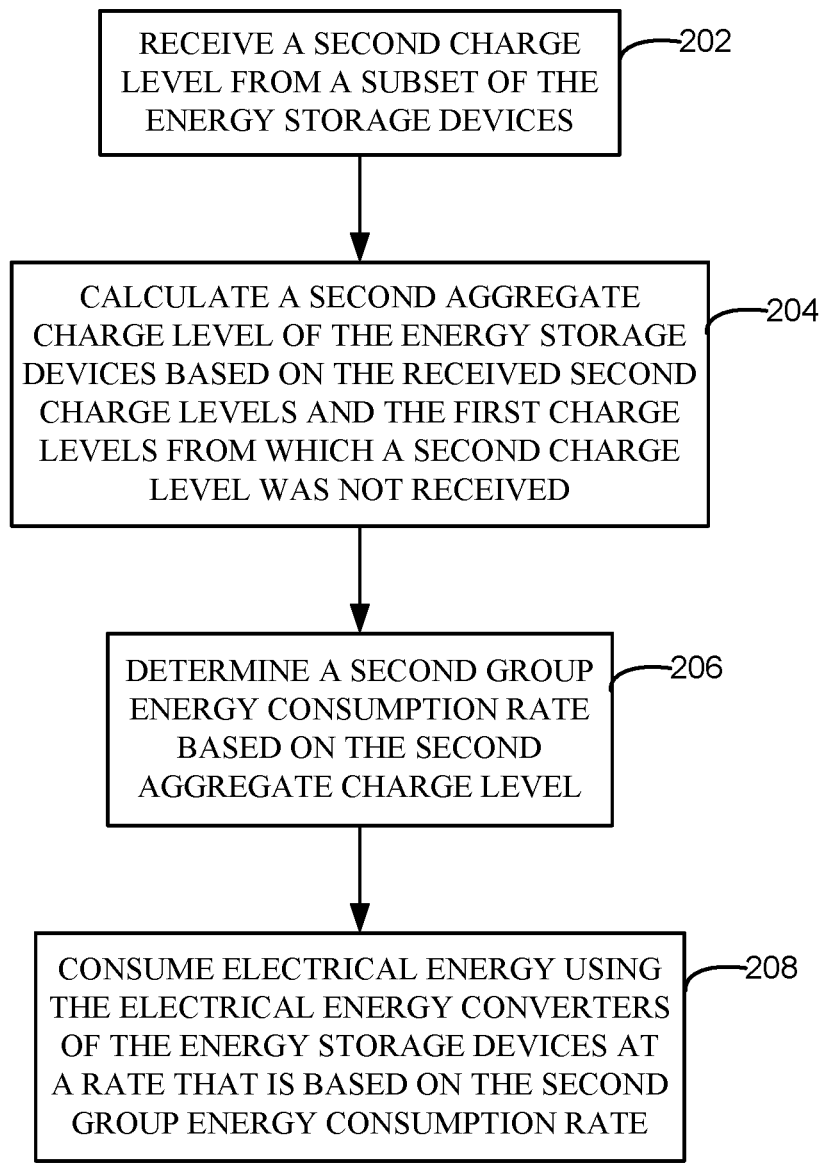

Some embodiments of the invention are directed to methods of handling situations in which charge levels of the devices 104 are not effectively communicated to the system controller 102 during the method of FIG. 6. Such a communication failure may occur due to, for example, a power outage, a component malfunction, a loss of network access, or other issue. FIG. 7 is a flowchart illustrating a method of handling such a situation, which may occur after the method of FIG. 6.

At step 202 of the method, a second charge level is received from a subset of the energy storage devices 104 of the group using the system controller 102. As a result, one or more energy storage devices 104 of the group fail to effectively communicate a second charge level corresponding to the current charge of their energy storage mediums 110 to the system controller in step 202.

In some embodiments, the system controller 102 uses the received second charge levels and the last received charge levels (e.g., first charge levels) from the energy storage devices 104, from which a second charge level was not received in step 202, to calculate an estimated second aggregate charge level for the energy storage devices 104 of the group, as indicated in step 204 of the flowchart of FIG. 7. As a result, the calculated second aggregate charge level constitutes an approximation of the actual aggregate charge level of the group of energy storage devices 104.

At 206 of the method, the system controller 102 determines a second group energy consumption rate based on the second aggregate charge level. At 208, electrical energy is consumed using the electrical energy converters 108 of the energy storage devices 104 at a rate that is based on the second group energy consumption rate. Embodiments of step 208 include those described above with regard to step 200 (FIG. 6).

In some embodiments, the first charge levels 194 used in step 204 do not necessarily refer to the charge levels of the devices 104 during the immediately preceding interval. In some embodiments, a time period limitation is placed on the amount of time that may lapse between the receipt of a charge level from an energy storage device 104 and the use of the charge level in the estimation of the aggregate charge level of the devices 104 due to the failure of the device 104 to communicate its current charge level to the controller 102. If the predefined time period has lapsed since the last charge level of a device 104 was effectively communicated to the system controller 102, the system controller 102 may drop the device 104 from the group, in accordance with some embodiments of the invention. In some embodiments, preceding charge levels of the devices 104 become invalid for the calculation of the current aggregate charge level of the group of devices 104 after the expiration of 5 minutes, 10 minutes, 15 minutes, 20 minutes, 25 minutes, or 30 minutes.

As mentioned above, in some embodiments the system controller 102 receives a command signal from the electrical power distribution system 112, which includes a commanded power consumption rate. In some embodiments of steps 198 and 206, the group energy consumption rate is calculated by the system controller 102 based on the aggregate charge level calculated in steps 196 and 204, the commanded power consumption rate and a charge level index 210 (FIG. 1). That is, the group energy consumption rate calculated or determined by the system controller 102 is dependent upon the calculated (194, 204) aggregate charge level (either actual or estimated), the commanded power consumption rate and the charge level index 210.

In some embodiments, the charge level index 210 comprises an S-curve or other mapping to correlate the group energy consumption rate based on the commanded rate and the actual or estimated aggregate charge level of the devices 104 of the group. Thus, the system controller 102 uses the index 210 to identify the group energy consumption rate based on the commanded rate and the calculated aggregate charge level of the devices 104. The index 210 may be stored in memory of the controller 102, memory 182 accessible by the controller 102, in the data store 124 (as shown), or in another suitable location that is accessible by the system controller 102. Accordingly, in some embodiments of the method, the system controller 102 acquires the charge level index 210 from its stored location.

Figure 8:
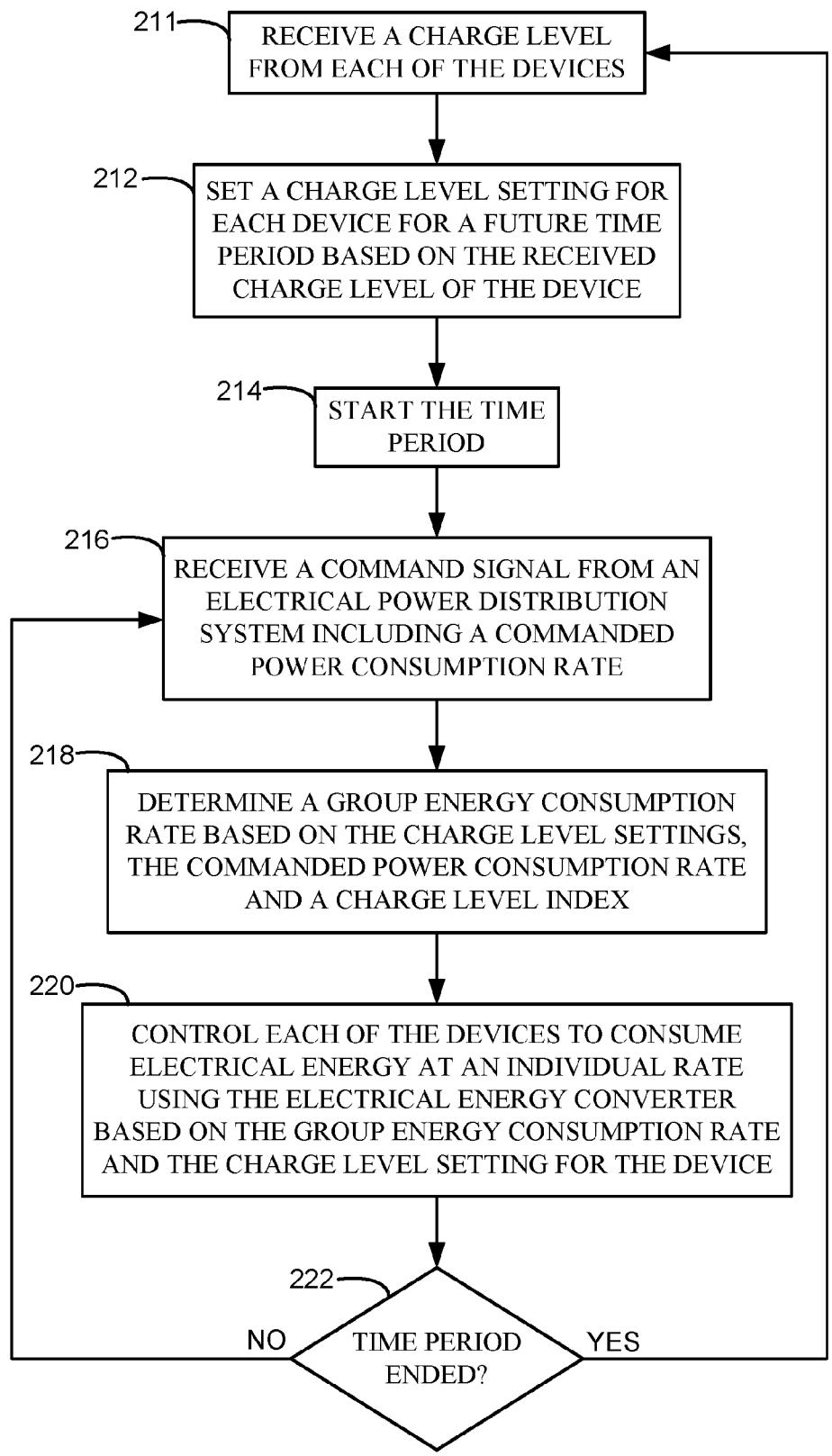

Some embodiments of the invention are directed to a method of managing electrical power consumption by a group of energy storage devices 104, each of which includes a device controller 106, an electrical energy converter 108, and an energy storage medium 110. FIG. 8 is a flowchart illustrating steps of the method in accordance with one or more embodiments of the invention.

At 211 of the method, a charge level 194 is received from each of the devices 104 of the group. In some embodiments of step 211, a power metering device 170 of each of the devices 104 communicates a signal 172, which represents the electrical load or rate of electrical energy consumption by the device 104, to the system controller 102, as described above.

At 212 of the method, the system controller 102 sets a charge level setting for each device 104 of the group for a future time period based on the received charge level of the device 104. In some embodiments, the charge level settings for the devices 104 are stored in memory that is accessible by the controller 102 and/or the devices 104, such as the data store 124. In some embodiments, the controller 102 communicates the charge level setting for each device 104 to the device 104 using a conventional data communication technique.

Once the future time period begins, at 214, the system controller 102 receives a command signal from an electrical power distribution system 112 that includes a commanded power consumption rate, at 216. The communication of the command signal and the commanded power consumption rate may be in accordance with one or more embodiments described herein.

At 218 of the method, a group energy consumption rate is determined by the system controller 102 or other suitable controller, based on the charge level settings of the devices 104, the commanded power consumption rate, and a charge level index 210. The charge level index 210 may be in accordance with one or more embodiments described above. In some embodiments, the system controller 102 acquires the index 210 from memory, and uses the index 210 to identify or calculate the group energy consumption rate based on the commanded rate and the charge level settings. In some embodiments, the charge level settings are aggregated by the system controller 102 or other controller to determine an aggregate charge level setting for the group of energy storage devices 104, which is used in step 218 to determine the group energy consumption rate in accordance with embodiments discussed above with regard to step 198 (FIG. 6). In some embodiments, the group energy consumption rate and/or aggregate charge level are stored in memory that is accessible by the controller 102, such as the data store 124.

At 220 of the method, each of the energy storage devices 104 is controlled to consume electrical energy at an individual rate using the electrical energy converter 108 based on the group energy consumption rate and the charge level setting for the device 104. In some embodiments, the device controller 106 calculates the individual rate of its device 104 based on the charge level setting for the device 104 and the group energy consumption rate. For instance, the device controller 106 may calculate the individual rate for a device 104 by subtracting the charge level setting for the device 104 from the group energy consumption rate provided to the device controller 106 by the system controller 102, in accordance with embodiments described above.

If the time period has not expired at 222, the method returns to step 216, where a new command signal may be received from the electrical power distribution system that includes a commanded power consumption rate. In some embodiments, the new commanded power consumption rate is different from the previously provided commanded power consumption rate. At 218, the system controller 102 determines a new group energy consumption rate based on the charge level settings assigned at step 212, the new commanded power consumption rate and the charge level index 210. At 220, the devices 104 are each controlled by their respective controllers 106 to consume electrical energy at an individual rate using the electrical energy converter 108 based on the new group energy consumption rate and the charge level setting for the device 104.

In some embodiments of step 212, the charge level setting for each device 104 is communicated to the device controller 106 of the device 104 in accordance with conventional communication techniques. In some embodiments, at least a plurality of the devices 104 of the group have different charge level settings. In some embodiments, the charge level settings for each of the devices 104 is the same as the charge level received from the devices 104 in step 211 of the method.

As step 220 of the method is repeated during the time period, the charge levels of the mediums 210 of the devices 104 within the group change from the charge levels reported to the system controller 102 in step 211 due to the consumption of electrical energy at the individual rates. However, in some embodiments, the charge level setting for each of the devices 104 that is used to determine the individual rate, at which the devices 104 consume electrical energy, remains fixed for the duration of the time period.

When the time period expires at 222, the method returns to step 211, where new current charge levels are received by the system controller 102 from each of the devices 104 of the group. The method is then repeated a limited number of times.

In some embodiments, the time period used in the method of FIG. 7 is approximately 5 minutes, less than 5 minutes, 10 minutes or less, 15 minutes or less, 20 minutes or less, or 30 minutes or less.

In some embodiments, the method illustrated in FIG. 8 corresponds to embodiments for carrying out the method described above with reference to FIGS. 3 and 4.

Figure 9:
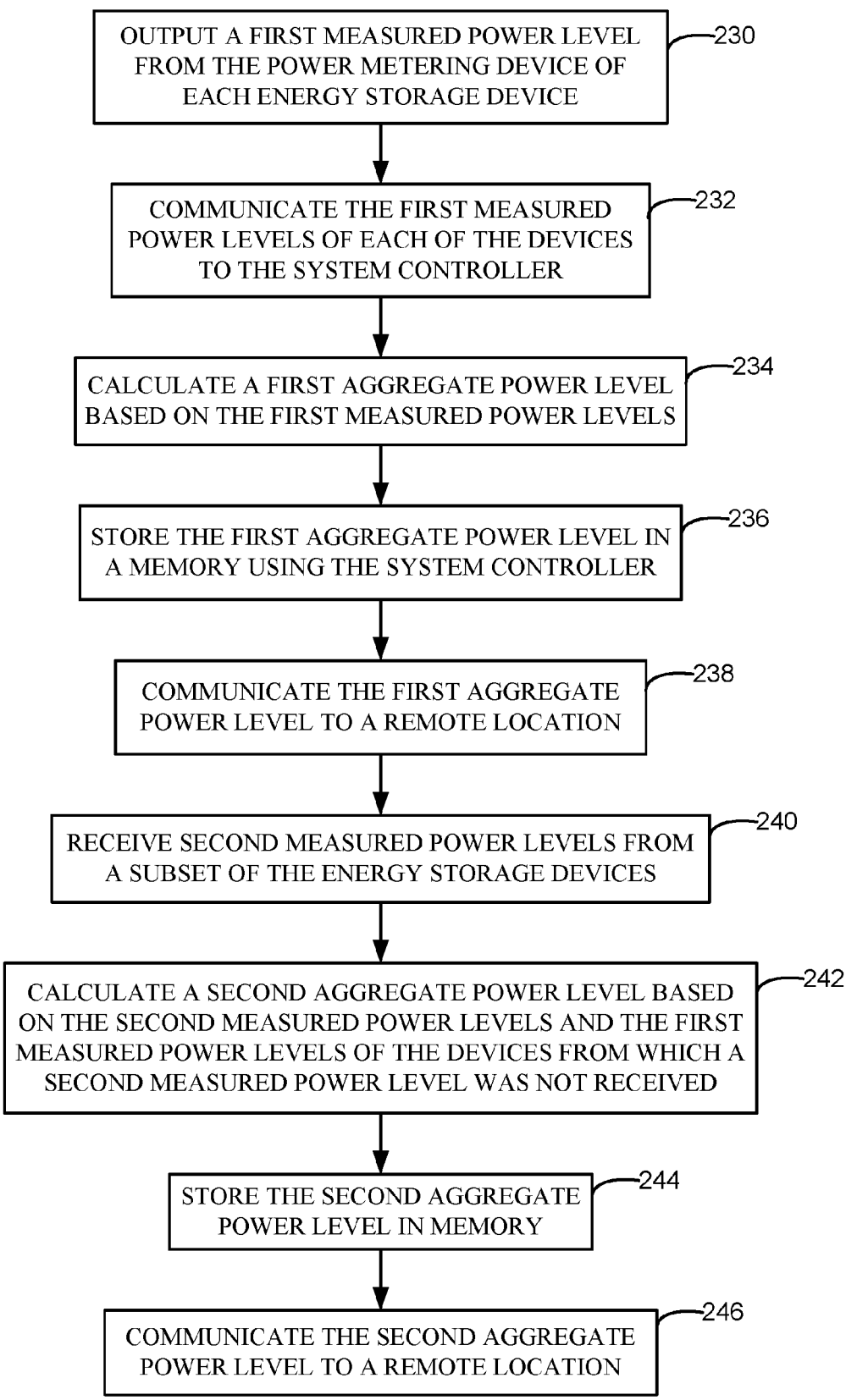

FIG. 9 is a flowchart illustrating a method of managing electrical power consumption by a group of energy storage devices 104, each of which include a device controller 106, an electrical energy converter 108, an energy storage medium 110 and a power metering device 170, as shown in FIG. 2. At step 230 of the method, a first measured power level 172 is output from the power metering device 170 of each energy storage device 104 of the group. At 232, the first measured power levels 172 are communicated to the system controller 102. Steps 230 and 232 of the method may be performed in accordance with one or more embodiments described above.

At 234, a first aggregate power level is calculated using the system controller 102 or other controller based on the first measured power levels 172. In some embodiments, the aggregate power level is calculated by summing the first measured power levels 172 received at step 230. In some embodiments, the first aggregate power level may be stored in memory, such as the data store 124 as power level 184, using the system controller 102, as indicated at 236.

At 238 of the method, the first aggregate power level is communicated to a remote location. As discussed above, the remote location may be the electrical power distribution system 112 responsible for supplying power to the devices 104 and for instructing the system controller 102 to direct the energy storage devices 104 to consume electrical energy at a commanded rate, in accordance with one or more embodiments described herein. Thus, the communication of the first aggregate power level to the electrical power distribution system 112 may provide verification as to whether the devices 104 satisfied the corresponding commanded rate or load. In some embodiments, step 238 is performed in response to a request from the remote location or system 112.

At step 240 of the method, second measured power levels are received by the system controller 102 or other controller from a subset of the energy storage devices 104 of the group. This may result from the devices 104 failing to effectively communicate their current power levels to the system controller 102 due to a failure or malfunction. In some embodiments, the second measured power levels 172 correspond to the current measurement provided by the power metering device 170.

At step 242 of the method, a second aggregate power level is calculated using the system controller 102 or other controller based on the second measured power levels 172 received at step 240, and the first or last-received measured power levels 172 of the devices 104, from which a second measured power level was not received at step 240. Thus, the second aggregate power level is an approximation of the actual electrical load or rate of electrical energy consumption provided by the group of energy storage devices 104. In some embodiments, the second aggregate power level is stored in memory, such as the data store 124, using the system controller 102 or other controller.

At 246 of the method, the second aggregate power level is communicated to a remote location, such as the electrical power distribution system 112. As discussed above, the second aggregate power level may be used by the electrical power distribution system 112 to verify whether the devices 104 were able to provide the targeted electrical load or rate of electrical energy consumption in accordance with a command from the electrical power distribution system 112.

As with the calculation of the estimated aggregate charge level of the devices 104 discussed above, the estimated aggregate power level of the devices 104 may be limited to the use of measured power levels communicated from the devices 104 within a predefined period of time. Embodiments of the predefined period of time include 1 minute, 2 minutes, 3 minutes, 4 minutes, 5 minutes, 10 minutes, less than 5 minutes, less than 10 minutes, or other predefined period of time. In some embodiments, when the predefined period of time expires since the last measured power level from a device 104 was received by the system controller 102, the system controller 102 removes the device 104 and its measured power level from the calculation performed at step 242.

In some embodiments, the measured power levels 172 are output from the power metering devices 170 during, for example, steps 230 and 240, in response to a request for the power level measurement from the system controller 102. Such a request may be provided to the device controllers 106, which respond by providing the current power level measurement 172 to the system controller 102. In some embodiments, the devices 104 automatically report their measured power levels at predetermined time intervals. Embodiments of the time interval include 1 second, 2 seconds, 4 seconds, less than 5 seconds, less than 10, and less than 15 seconds.

In some embodiments, the system controller 102 is configured to communicate the actual or estimated aggregate power levels (steps 238 and 246) to the remote location or system 112 at predefined short intervals. Embodiments of the short interval include 1 second, 2 seconds, 4 seconds, less than 5 seconds, less than 10 seconds, less than 15 seconds, less than 30 seconds and less than 1 minute.

In summary, the method of FIG. 9 describes steps that are performed to notify the electrical power distribution system 112 of the electrical load currently being provided by the energy storage devices 104, preferably in response to a commanded electrical load from the electrical power distribution system 112. When the system controller 102 fails to receive an update of the current electrical load being provided by one or more of the devices 104 in the group, the last received measured power level from the device 104 is used to calculate the aggregate power level or electrical load provided by the group of energy storage devices 104. This last received measured power level may be used for a predefined period of time before it is eliminated from the aggregate power level calculation. In the event communication is reestablished with the device 104, and a current measured power level is communicated to the system controller 102, the measured power level of the energy storage device 104 may again be used in the calculation of the aggregate power level by the system controller 102.

Although the present invention has been described with reference to preferred embodiments, workers skilled in the art will recognize that changes may be made in form and detail without departing from the spirit and scope of the invention. For example, the devices 104 may take on other forms other than the heating and battery charging devices described herein. Also, it is understood that while the schematic diagram of FIG. 1 may depict certain components as residing in or on a certain device, those components, or portions thereof, could be located outside or remotely from the device. For instance, the device controller 106, or components thereof, could be located remotely from the converter and medium while performing the functions described herein in accordance with embodiments of the invention.

What is claimed is:

1. A method of managing electrical power consumption by a group of energy storage devices, each energy storage device comprising a device controller, an electrical energy converter, an energy storage medium and a power metering device, the method comprising:
    outputting a measured power level from the power metering device of each energy storage device, each power level representing a rate of electrical energy consumption by the electrical energy converter of the energy storage device;
    communicating the measured power levels of each of the energy storage devices to a system controller using the device controllers;
    calculating an aggregate power level based on the measured power levels using the system controller;
    storing the aggregate power level in memory using the system controller; and
    consuming electrical energy using the electrical energy converters of the energy storage devices comprising:
        a) receiving a first charge level from each of the energy storage devices using the system controller, each charge level indicating a level of charge of the energy storage medium;
        b) calculating a first aggregate charge level of the energy storage devices based on the first charge levels using the system controller;
        c) calculating a group energy consumption rate based on the first aggregate charge level using the system controller;
        d) consuming electrical energy using the electrical energy converters of the energy storage devices at individual rates that are based on the group energy consumption rate;
        e) receiving a second charge level from a subset of the energy storage devices using the system controller;
        f) calculating a second aggregate charge level of the energy storage devices based on the received second charge levels and the first charge levels of the energy storage devices from which a second charge level was not received in step e);
        g) determining a second group energy consumption rate based on the second aggregate charge level using the system controller; and
        h) consuming electrical energy using the electrical energy converters of the energy storage devices at a rate that is based on the second group energy consumption rate.

2. The method according to claim 1, further comprising communicating the aggregate power level to an electrical power distribution system using the system controller.

3. The method according to claim 1, wherein:
    the method further comprises communicating a control signal indicating the group energy consumption rate from the system controller to the device controllers; and
    the consuming step d) comprises consuming electrical energy using the electrical energy converters of the energy storage devices at the individual rates, which are based on the control signal.

4. The method according to claim 1, wherein for each energy storage device, the consuming step d) comprises:
    calculating the individual rate based on the group energy consumption rate and the first charge level of the energy storage device; and
    consuming electrical energy at the individual rate using the electrical energy converter of the energy storage device.

5. The method of claim 4, wherein calculating the individual rate for each energy storage device based on the group energy consumption rate comprises calculating a difference between the group energy consumption rate and the first charge level of the energy storage device.

6. The method according to claim 1, wherein:
    the method further comprises receiving a command signal from an electrical power distribution system using the system controller, the command signal including a commanded power consumption rate; and
    calculating a group energy consumption rate comprises calculating the group energy consumption rate based on the aggregate charge level, the commanded power consumption rate and a charge level index, using the system controller.

7. The method according to claim 1, wherein the energy storage medium includes one of a heat storage medium, a battery, and a chemical storage medium.

\* \* \* \* \*